(12) United States Patent
Haupt

(10) Patent No.: US 6,350,108 B1
(45) Date of Patent: Feb. 26, 2002

(54) OIL PUMP

(75) Inventor: Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/530,215

(22) PCT Filed: Nov. 9, 1998

(86) PCT No.: PCT/EP98/07138

§ 371 Date: Apr. 26, 2000

§ 102(e) Date: Apr. 26, 2000

(87) PCT Pub. No.: WO99/25979

PCT Pub. Date: May 27, 1999

(30) Foreign Application Priority Data

Nov. 15, 1997 (DE) .......................... 197 50 675

(51) Int. Cl.[7] .................... F04B 17/00; F04B 35/00
(52) U.S. Cl. ................. 417/364; 123/196 S; 123/198 E
(58) Field of Search ...................... 417/364; 123/196 S, 123/198 E

(56) References Cited

U.S. PATENT DOCUMENTS

| | | | | |
|---|---|---|---|---|
| 2,747,564 A | * | 5/1956 | Wehling | 123/196 S |
| 4,531,485 A | * | 7/1985 | Murther | 123/196 S |
| 5,511,522 A | * | 4/1996 | Tran | 123/196 S |
| 5,765,521 A | * | 6/1998 | Stutzle et al. | 123/196 S |
| 6,039,666 A | * | 3/2000 | Okuda et al. | 475/72 |

FOREIGN PATENT DOCUMENTS

| | | |
|---|---|---|
| DE | 1 528 515 | 6/1971 |
| DE | 38 12 412 A1 | 10/1989 |
| EP | 0 682 756 B1 | 1/1997 |

* cited by examiner

*Primary Examiner*—Teresa Walberg
*Assistant Examiner*—Thor Campbell
(74) *Attorney, Agent, or Firm*—Davis & Bujold, P.L.L.C.

(57) ABSTRACT

The oil pump for an automatic motor vehicles having a housing, a pump wheel, an internal geared wheel and a drive wherein the drive has a mechanical driving part connected with the internal combustion engine of the motor vehicle and an electric driving part connected with the on-board network of the motor vehicle.

16 Claims, 5 Drawing Sheets

Required Power Delivery of the Pump:

For Traditional One-Pump System $\quad P_{Pump} = P9 + P10 + PV$

For Inventive Two-Pump System $\quad P_{Pump} = P9 + P10$

OIL PUMP

The invention concerns an oil pump for motor vehicle transmissions.

BACKGROUND OF THE INVENTION

Automatic or continuously variable transmissions of motor vehicles require an oil pump for the supply of the lubrication device and of the control and actuation devices, which is often designed as a displacement pump and is driven at the rotational speed of the prime mover of the motor vehicle.

The oil pump is still today predominantly designed as a so-called constant pump whose flow rate increases in proportion to its driving rotational speed. Here the pump is generally designed based on the idling speed of the engine. The delivered flow rate already must meet the requirements of the automatic transmission to be supplied. However, at high rotational speeds of the engine, such a constant pump, delivers many times the amount required. Thereby such constant pumps consume too much power, cavitate and produce an excessive level of noise. In addition, the duct cross sections have to be extensively overdimensioned.

In automatic transmissions, so-called variable displacement pumps, have already been used which have a flow rate better adaptable to supply needs but, which in the lower to middle rotational speed of the engine, which are relevant for consumption, have a poorer degree of efficiency than a constant pump. Moreover, they deliver too little oil at low rotational speeds of the engine.

There have already been proposed suction-controlled constant pumps for automatic transmissions of passenger motor vehicles (EP 0 682 756), to overcome the disadvantage, specifically in the form of a suction-throttled radial piston pump which, starting from a certain rotational speed, delivers an almost constant flow rate which also requires almost constant powerconsumption. A suction-throttled radial piston pump has the disadvantage of an elevated development of noise.

Finally, pumps purely electrically operated have also been installed in automatic transmissions for passenger vehicles, but they have the disadvantage of heavily loading the electric on-board network of the passenger car when they exclusively must ensure the total oil supply of the automatic transmission.

Mechanically driven 2-pump systems (tandem pumps) are also known in which one of the two pumps is switched to pressureless delivery at high rotational speeds (Cadillac plant). But, they also deliver too little oil in the lower rotational speed range and cannot be properly controlled. The insufficient delivery amount at low rotational speeds can be explained by the fact that the volumetric degree of efficiency is very poor and, therefore, the use of two slowly rotating pumps is not logical.

The problem on which this invention is based is to provide an oil pump for motor vehicle transmissions which has a low level of noise and, which at every rotational speed range, makes the needed flow rate.

On the basis of an oil pump of the kind mentioned in detail above, this problem is solved.

SUMMARY OF THE INVENTION

The oil pump is provided with a lesser displacement volume in comparison with the purely mechanically operated oil pumps; the use of an electric driving part makes it possible, at low engine rotational speeds, to bring the oil pump to higher rotational speeds and thus to deliver more oil at these low rotational speeds. In the low rotational speed range, i.e. in the range of up to 1500 rpm, the pump is exclusively driven by the electric driving part. A provided freewheel makes it possible for the rotational speed of the oil pump to be higher than the rotational speed of the internal combustion engine. With a rotational speed range, beginning at approximately 1500 rpm, the internal combustion engine of the motor vehicle rotates quicker than the electromotor that constitutes the electric driving part. The internal combustion engine now locks to the freewheel and assumes the actuation of the oil pump. The electric driving part is simultaneously disconnected.

In one other embodiment of this invention, the electric driving part is an independent electric pump which, together with the mechanically driven pump, is connected with a valve device which supplies the automatic transmission with the required oil current. In this case as in the torque converter, the lubrication is basically supplied, via the mechanical driving part, which is driven by the internal combustion engine of the motor vehicle while the clutches are basically supplied via the electric driving part. A superimposed oil current control occurs in the valve unit and it is possible to substitute any other driving part for the mechanical driving part. In another development a hydraulic accumulator is used which makes possible the storage of the oil delivered between gear shifts.

BRIEF DESCRIPTION OF THE DRAWINGS

The invention is described, in further detail herebelow, with reference to the drawing which shows advantageous embodiments. In the drawings.

DESCRIPTION OF THE PREFERRED EMBODIMENTS

Figure 1:
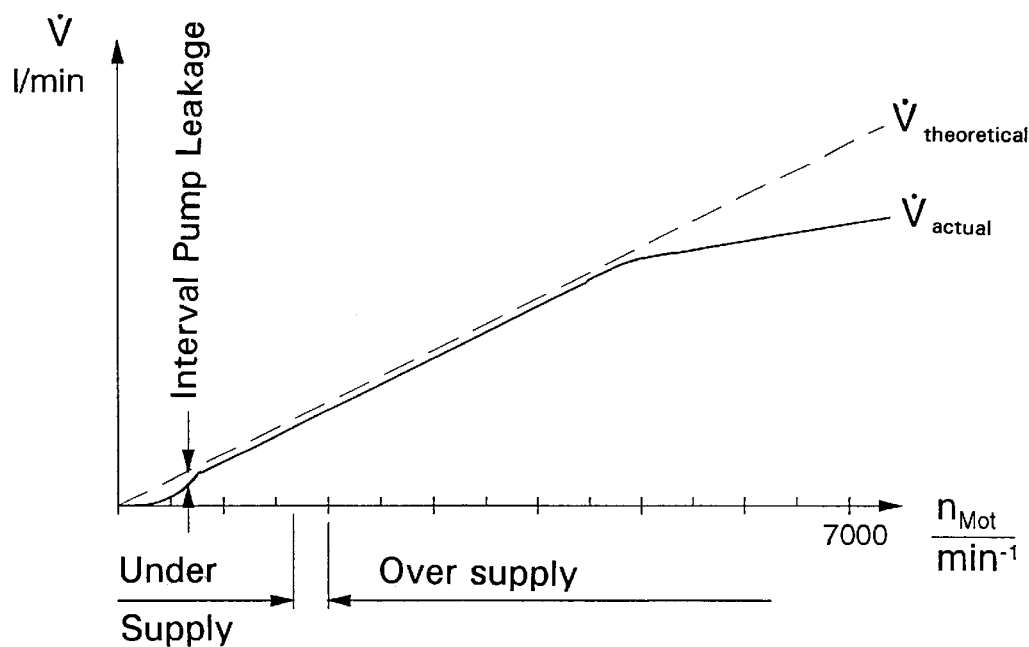
FIG. 1 is a graphic representation of the theoretical and practical flow rate of a constant pump.

In the graphic representation shown in FIG. 1, the rotational speed $n_{mot}$ of the engine is plotted on the abscissa and the flow rate V on the ordinate. The dotted line shows the increasing theoretical flow rate of a conventional constant pump, according to the rotational speed, whereas the unbroken line shows the actual flow rate. The actual flow rate is lower by the interior pump leakage than the theoretical flow rate. It is noted that in the rotational speed range of up to about 1000 rpm, there is an under supply of oil to the transmission, due to the great internal pump leakage, and there is an oversupply in a higher rotational speed range, starting with about 3000 rpm.

Figure 2A:
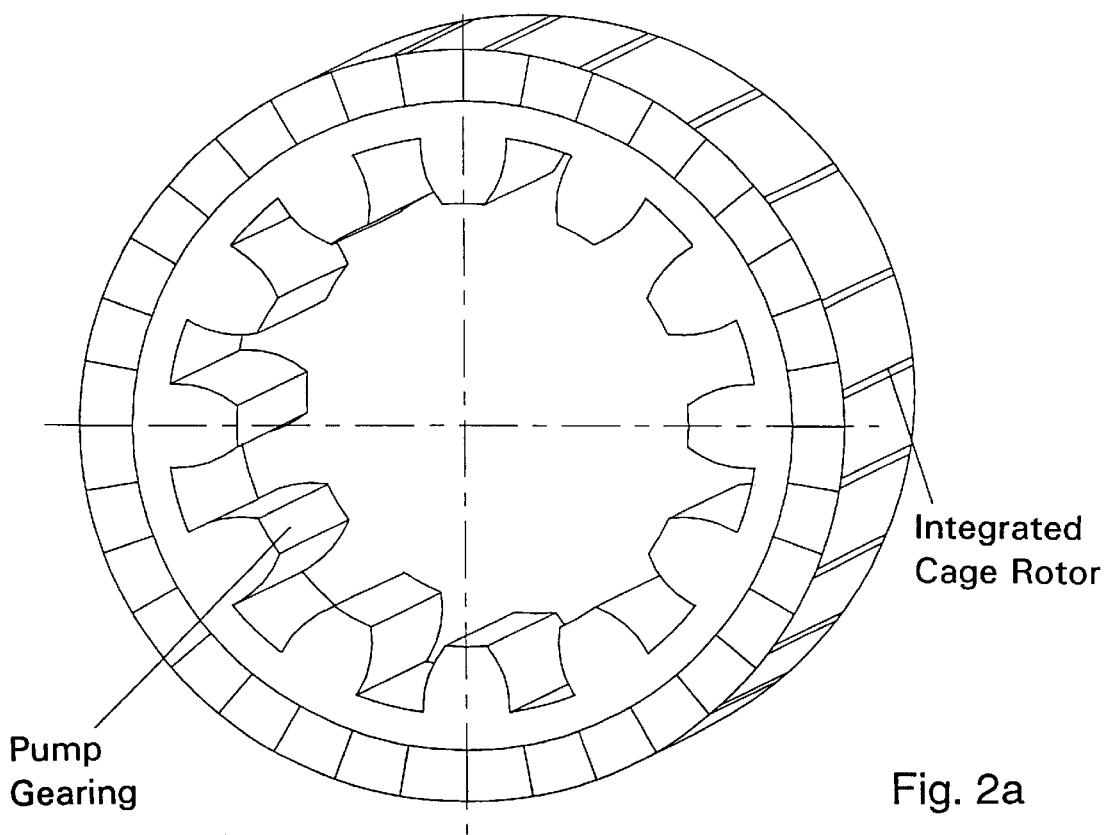
FIG. 2a is a view on the motor-rotor of the inventive oil pump which is at the same time forms the internal geared wheel of the pump.
Figure 2:
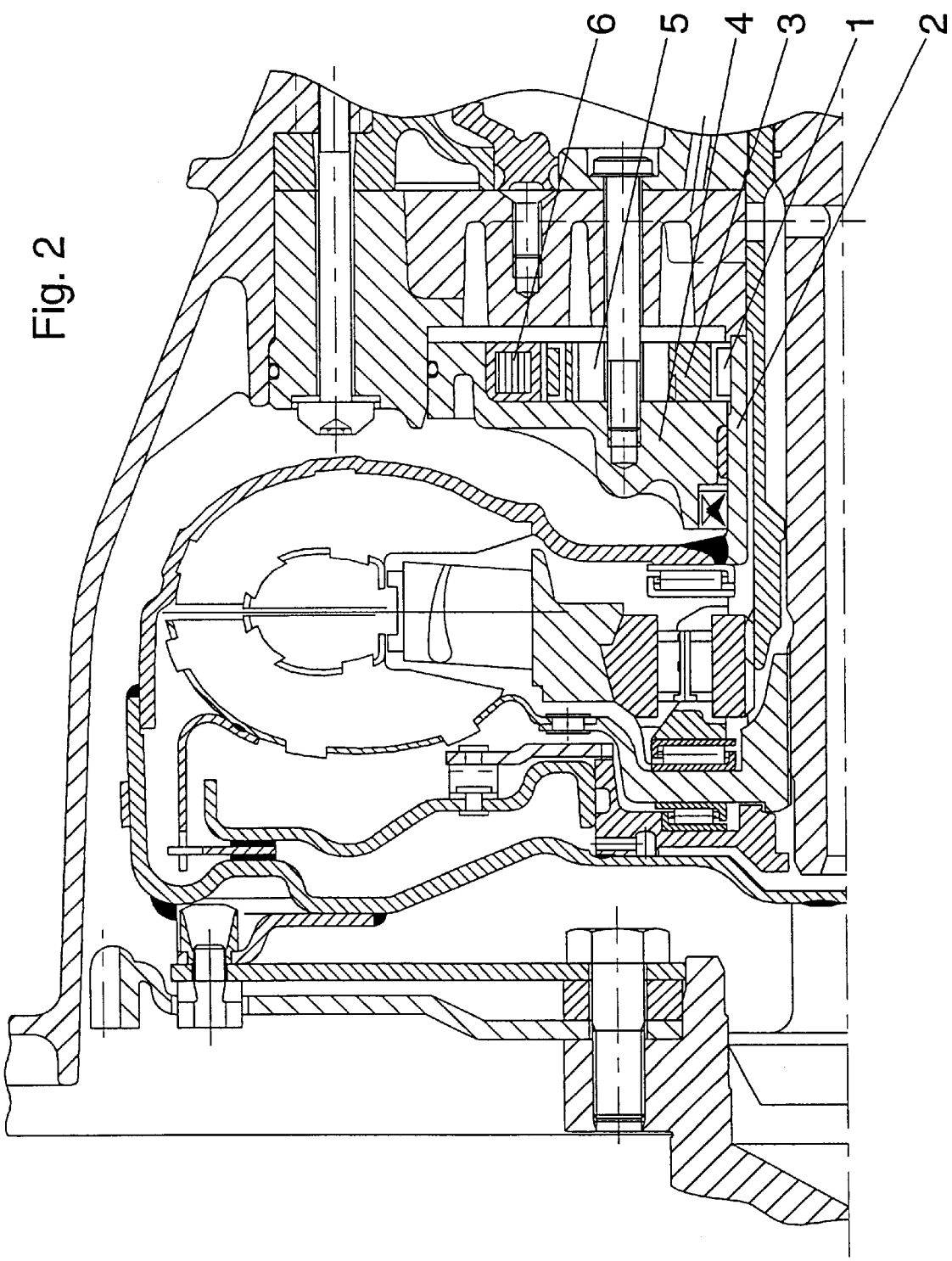
FIG. 2 is a section through the essential component parts of an inventive oil pump.

According to the invention, the drive of the oil pump, which has a housing, a pump wheel and an internal geared wheel, is divided into a mechanical drive part and an electric drive part, which can be separately controlled, the electric drive part is integrated in the mechanical drive part in the embodiment of FIG. 2.

In FIG. 2, only the essential parts of the oil pump, necessary for understanding the invention, have been provided with a reference numeral, with 4 is designated the pump housing, in which one pump wheel 3 and one internal geared wheel 5 are situated. With 2 is designated a torque converter collar and with 6 a stator winding. In the internal geared wheel 5 is provided an integrated cage rotor 7, as is clearly shown in FIG. 2a. However, in addition to the principle of short circuited or cage rotor engine, other principles of electric machines are conceivable.

In the lower rotational speed range, i.e. up to about 1500 rpm, exclusively the electric driving part operates the oil pump. At the same time, the freewheel designated with 1 makes possible that the rotational speed of the oil pump is higher than the rotational speed of the internal combustion engine of the motor vehicle.

The electric driving part comprises the stator winding 6, the internal geared wheel 5, which in cage rotor design, e.g. operates as the rotor of the electric driving part and the current supply (not shown). The current supply can be ensured either by converting the direct current from the on-board network into an alternating current, particularly a 3-phase alternating current, or by using the 3-phase alternating current of the alternator by tapping the latter before the rectifier diodes.

When reaching a higher, preset rotational speed range, starting from about 1500 rpm, the internal combustion engine of the motor vehicle rotates quicker than the electric driving part of the oil pump. This means that through the freewheel 1 the mechanical driving part assumes the exclusive drive of the oil pump and the electric driving part is switched off.

Figure 3:
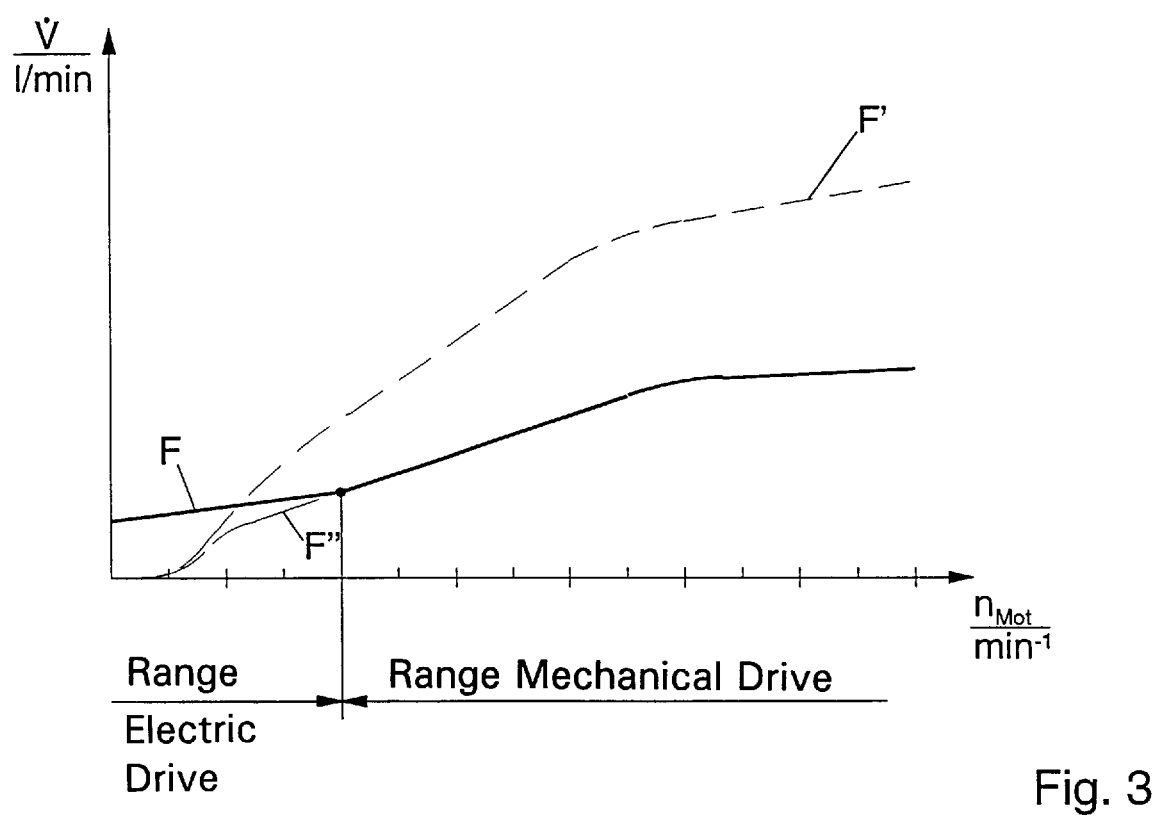
FIG. 3 is a graphic representation of the known and of the inventive flow rate curve according to the engine rotational speed.

In the graphic representation of FIG. 3, the engine rotational speed $n_{mot}$ is again plotted on the abscissa and the flow rate V on the ordinate. With F is designated the curve which reproduces the flow rate course of the inventive oil pump; with F' the curve which reproduces the flow rate course of the conventional oil pumps and with F" the curve which reproduces the flow rate course of the inventive oil pump when the electric driving part fails, i.e. the emergency supply of the automatic transmission.

Since the minimum rotational speed of the pump determined by the electric drive is substantially higher by the factor 2–3 than in conventional mechanical pumps, the displacement volume of the pump can be designed substantially smaller. The reduced displacement volume of the oil pump leads to a considerable reduction of the power consumption in the operating range relevant for consumption. The additional drive of the oil pump with the electric driving part covers the oil supply from the lower rotational speed range, since the rotational speed of the driving part designed as electromotor is higher than the rotational speed of the internal combustion engine of the motor vehicle. Since in the lower rotational speed range still no high engine torques have to be transmitted, the required clutch pressures also are still relatively low. Therefore, the electric driving part does not consume much power, which does not overload the electric on-board network.

The integration of the rotor of the electric drive part in the internal geared wheel reduces the installation space; the freewheel between the torque converter collar and the pump wheel enables the electric driving part to drive the pump quicker than the mechanical driving part.

One other advantage to be seen is that the clutches can be closed when the internal combustion engine of the motor vehicle still is not started so that a tow starting of the motor vehicle and a start of the internal combustion engine are made possible.

By virtue of the oil supply of the transmission independent of the internal combustion engine in the lower rotational speed range, it is possible that the idling rotational speed of the internal combustion engine is further lowered whereby the static consumption is reduced, since the torque converter response diminishes quadratically with the engine rotational speed.

Figure 4:
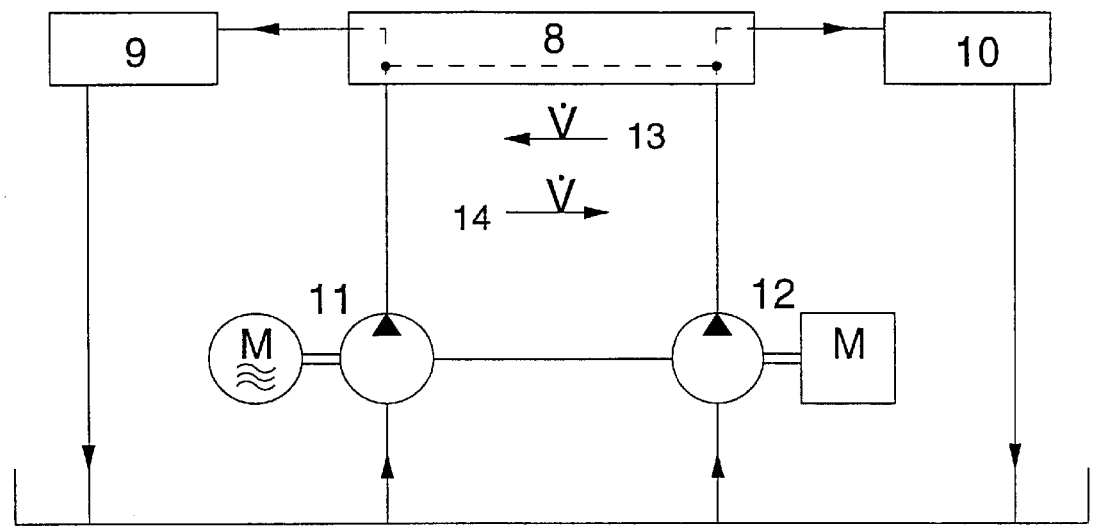
FIG. 4 is a diagrammatic representation of one other embodiment of an oil pump having two driving and pump parts designed independently of each other.
Figure 4A:
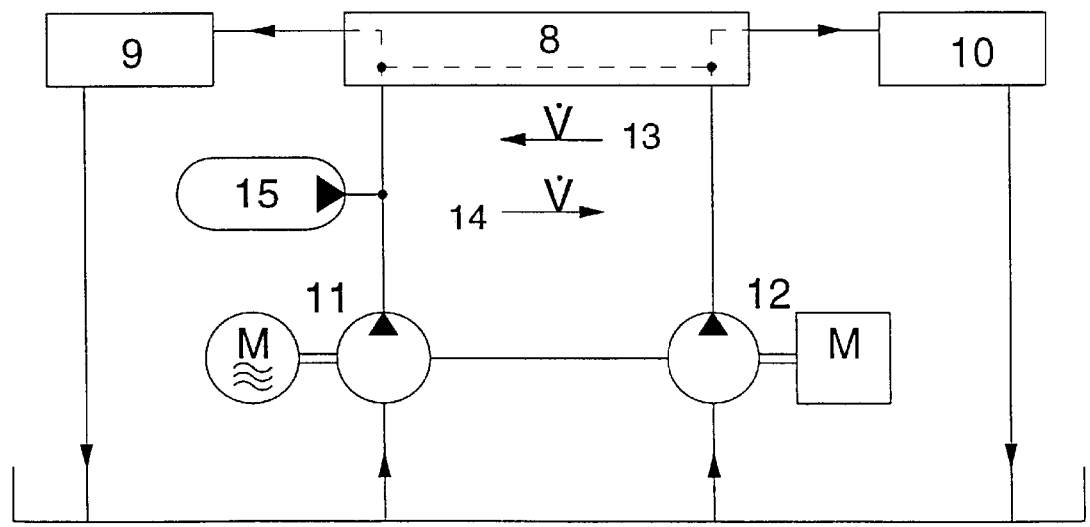
FIG. 4a is a representation like FIG. 4, but with addition of hydraulic accumulator and recoil valve.

In the embodiment diagrammatically shown in FIG. 4, an electric driving part designed as independent part and having its own pump 11 is provided, the driving part is integrated in the mechanically driven oil pump 12 (draft with two pumps). With 8 is here designated a valve unit which is actuated both by the electric driving part 11 and by the mechanical driving part 12 and in which the oil current control is superimposed. The valve unit communicates on one side with the clutches 9 to be supplied with oil and, on the other, with the lubrication indicated with 10 and the torque converter of the transmission. With 13 and the arrow pointed to the left is here indicated that the mechanical driving part 12, which is driven by the internal combustion engine of the motor vehicle, during the filling phase of the clutches indicated by 9 at high rotational speeds assists the electric driving part and with 14 and the arrow pointed to the right is indicated that the electric driving part 11 at low rotational speeds assists the lubrication and the torque converter of the automatic transmission. That is, basic supply of the lubrication and of the torque converter occurs via the mechanical driving part and thus via the internal combustion engine and the basic supply of the clutches occurs via the electric driving part. In another embodiment, a hydraulic accumulator 15 is inserted in order to use the flow rate not only for the gear shift but also for subsequent gear shifts. This is specifically convenient in non-regulatable electric drives 11. In regulatable electric drives, the rotational speed between the gear shifts, is preferably reduced. With 16 is designated a recoil valve which is placed in the pipe from the hydraulic accumulator 15 to the pump 11 and prevents reflux to the pump 11 of the accumulator contents.

Figure 5:
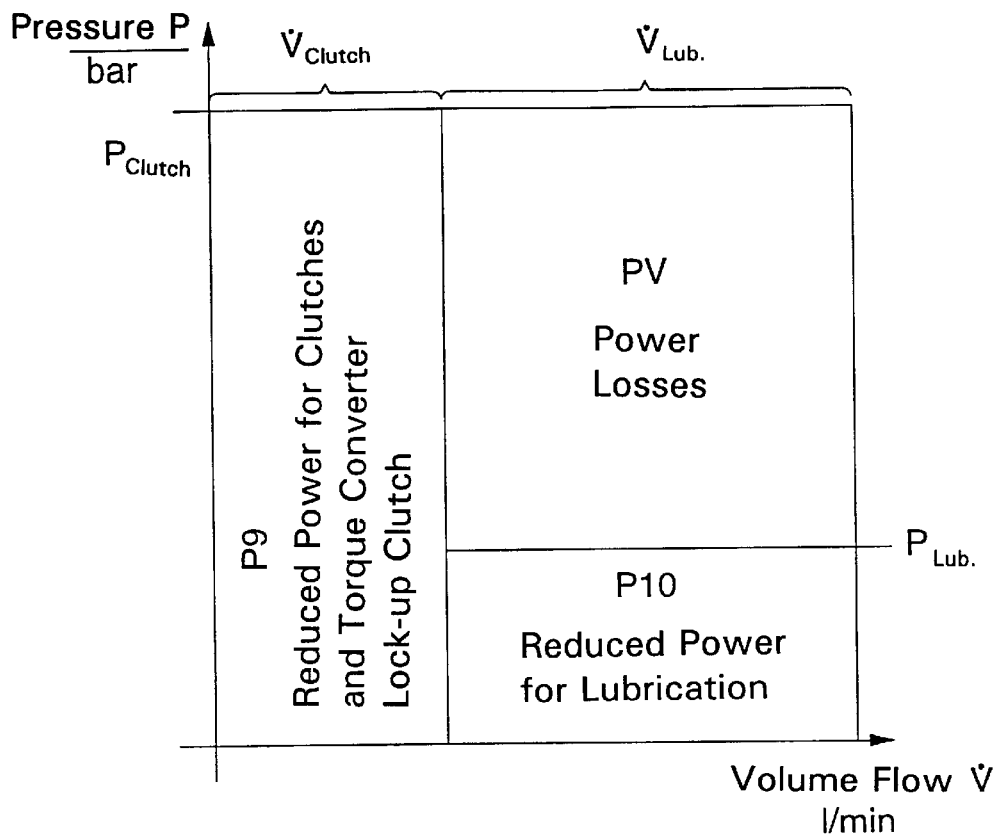
FIG. 5 shows a graphic comparison of the required pump operating speeds outside the transmission shift system (closed or controlled torque converter lock-up clutch).

In FIG. 5 is graphically shown a comparison of the pump operating speed outside the gear shifts of the transmission with heavy load. The delivery pressure p (in bar) is plotted on the ordinate and the flow rate V (in 1/min) on the abscissa. State: closed or regulated torque converter clutch. At a pressure determined by the clutches and a total flow rate determined by the clutches and lubrication, a specific performance results. When using a single conventional pump, this is the operating speeds of the pump. The power PV, not utilizable in the transmission, results as power losses.

When using an oil system constructed, according to the invention, consisting of a mechanically driven pump and an electrically driven pump, a total operating speed reduced by PV is needed.

As already explained in relation to the embodiments, the clutches in the automatic transmission are primarily supplied via the electric driving part, since a higher pressure is required for this. But the higher pressure proceeds with a low flow rate.

Besides the shifting operations in the transmission, the electric driving part supplies the clutches (only leakage but higher pressure needed) while the mechanical part takes over the lubrication and supplies the torque converter with a relatively large flow rate at low pressure. Due to the division of the oil supply, the discharged hydraulic power becomes better adapted to the need of the transmission, whereby the consumption of power as a whole, is reduced.

The advantage compared with a single electric driving part of larger dimensions is that a still lower power consumption therewith and a still further reduced load of the on-board network are made possible. Finally, in further development of the invention, it is also possible to substitute for the mechanical driving part of the oil pump actuated by the internal combustion engine of the motor vehicle any other driving part desired.

To be able to reduce the driving power of the electric pump 11, the needed flow rate, which is required outside the gear shift operations, must be reduced. This can be done by designing the shifting logic of the hydraulic selector unit and the pressure regulator in a manner such that less unused oil is spattered (selector unit leakage).

REFERENCE NUMERALS 1 freewheel
2 torque converter collar
3 pump wheel
4 pump housing
5 internal geared wheel
6 stator winding
7 cage rotor
8 valve unit
9 transmission clutches and torque converter lock-up clutch
10 torque converter & lubrication
11 electric driving part
12 mechanical driving part
13 clutch support
14 converter & lubrication support
15 hydraulic accumulator
16 recoil valve
F flow rate curve of the inventive oil pump
F' flow rate curve of the traditional oil pump
F" flow rate curve of the inventive oil pump during failure of the electric driving part

What is claimed is:

1. An oil pump for a transmission of a motor vehicle, the oil pump comprising:
a pump housing accommodating a pump wheel (3) and an internal geared wheel (5); and
a drive for driving the oil pump;
wherein the drive comprises a mechanical driving part connected with an internal combustion engine of the motor vehicle and an electric driving part consisting of a cage rotor (7) integrated in the internal geared wheel (5) and a stator winding (6) surrounding the internal gear wheel (5), and the electric driving part is connected with an on-board electrical network of the motor vehicle and operates independently of the mechanical driving part.

2. The oil pump according to claim 1, wherein the mechanical driving part has a freewheel (1) located between a torque converter collar (2) and the pump wheel (3).

3. The oil pump according to claim 2, wherein the oil pump is electrically driven by an electric drive, when the internal combustion engine is idling, so that the motor vehicle can be tow started.

4. The oil pump according to claim 1, wherein the electric driving part is an independent electric pump which, together with a mechanically driven pump, is connected with a valve unit (8) which supplies oil to a plurality of clutches (9) of the transmission and to a torque converter (10) of the transmission for at least one of operation and lubrication of the plurality of clutches (9) and the torque converter (10).

5. The oil pump according to claim 4, wherein, when the electric driving part is operating, the oil pump normally supplies the plurality of clutches (9) with a higher pressure oil at a lower flow rate and supplies the torque converter with a lower pressure oil, and the oil pump, when the mechanical driving part is operating, supplies a higher flow rate of the oil.

6. The oil pump according to claim 5, wherein the electric pump (11) is connected with a hydraulic accumulator (15) to facilitate compensation for variation in an oil requirement of the plurality of clutches (9) and the torque converter (10) which varies over time, and a recoil valve (16) prevents reflux of oil from the hydraulic accumulator (15) to the electric pump (11).

7. An oil pump for a transmission of a motor vehicle, the oil pump comprising:
a pump housing accommodating a pump wheel (3) and an internal geared wheel (5); and
a drive for driving the oil pump;
wherein the drive comprises a mechanical driving part connected with an internal combustion engine of the motor vehicle and an electric driving part comprising a cage rotor (7) integrated in the internal geared wheel (5) and a stator winding (6) surrounding the internal gear wheel (5), and the electric driving part is connected with an on-board electrical network of the motor vehicle and operates independently of the mechanical driving part to supply driving power to the internal geared wheel (5).

8. The oil pump according to claim 7, wherein the mechanical driving part has a freewheel (1) located between a torque converter collar (2) and the pump wheel (3) and the torque converter collar (2) supports the stator winding (6).

9. The oil pump according to claim 8, wherein the oil pump is electrically driven by an electric drive when the internal combustion engine is idling.

10. The oil pump according to claim 7, wherein the electric driving part is an independent electric pump which, together with a mechanically driven pump, is connected with a valve unit (8) which supplies oil to a plurality of clutches (9) of the transmission and to a torque converter (10) of the transmission for at least one of operation of the transmission and lubrication of the plurality of clutches (9) and the torque converter (10).

11. The oil pump according to claim 10, wherein, when the electric driving part is operating, the oil pump normally supplies at least one of the plurality of clutches (9) and the torque converter with a lower flow rate of oil, and
the oil pump, when the mechanical driving part is operating, supplies at least one of the plurality of clutches (9) and the torque converter with a higher flow rate of the oil.

12. The oil pump according to claim 11, wherein an electric pump (11) is connected with a hydraulic accumulator (15) to facilitate compensation for variation in an oil requirement of the plurality of clutches (9) and the torque converter (10) which varies over time, and a recoil valve (16) prevents reflux of oil from the hydraulic accumulator (15) to the electric pump (11).

13. An oil pump for a transmission of a motor vehicle, the oil pump comprising:

a pump housing accommodating an internal geared wheel (5); and a drive for driving the oil pump;

wherein the drive comprises a mechanical driving part connected with an internal combustion engine of the motor vehicle and an electric driving part comprising a cage rotor (7) integrated in the internal geared wheel (5) and a stator winding (6) surrounding the internal gear wheel (5), and the electric driving part is connected with an on-board electrical network of the motor vehicle and operates independently of the mechanical driving part to supply driving power to the internal geared wheel (5).

14. The oil pump according to claim 13, wherein the mechanical driving part has a freewheel (1) located between a torque converter collar (2) and the pump wheel (3) and the torque converter collar (2) supports the stator winding (6).

15. The oil pump according to claim 14, wherein the oil pump is electrically driven by an electric drive when the internal combustion engine is idling.

16. The oil pump according to claim 13, wherein the electric driving part is an independent electric pump which, together with a mechanically driven pump, is connected with a valve unit (8) which supplies oil to a plurality of clutches (9) of the transmission and to a torque converter (10) of the transmission for at least one of operation of the transmission and lubrication of the plurality of clutches (9) and the torque converter (10).

* * * * *